Figure 1:
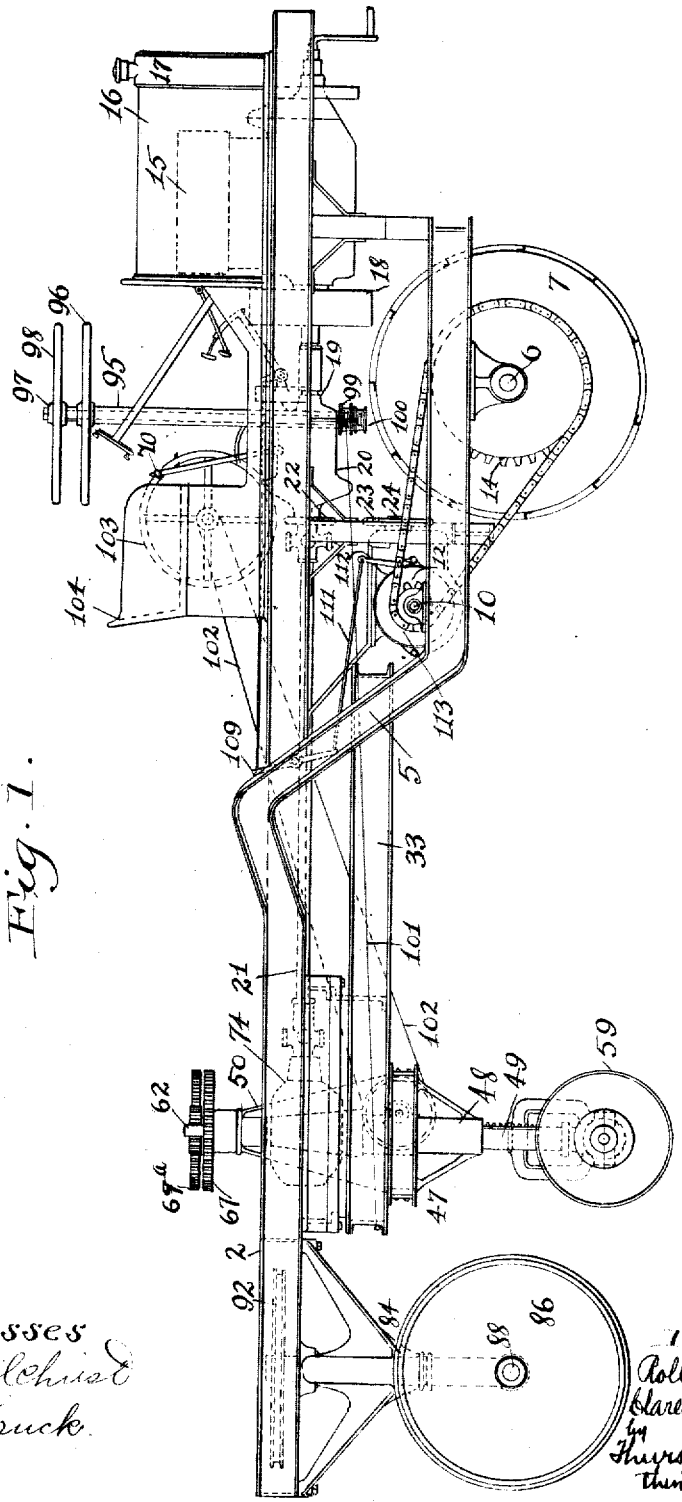

R. H. & C. G. WHITE.
POWER PROPELLED AGRICULTURAL MACHINERY.
APPLICATION FILED JUNE 8, 1912.

1,260,738.

Patented Mar. 26, 1918.
5 SHEETS—SHEET 1.

Witnesses
E. B. Gilchrist
P. L. Bruck.

Inventor
Rollin H. White
Clarence G. White
by Thurston Alvis
their attorney

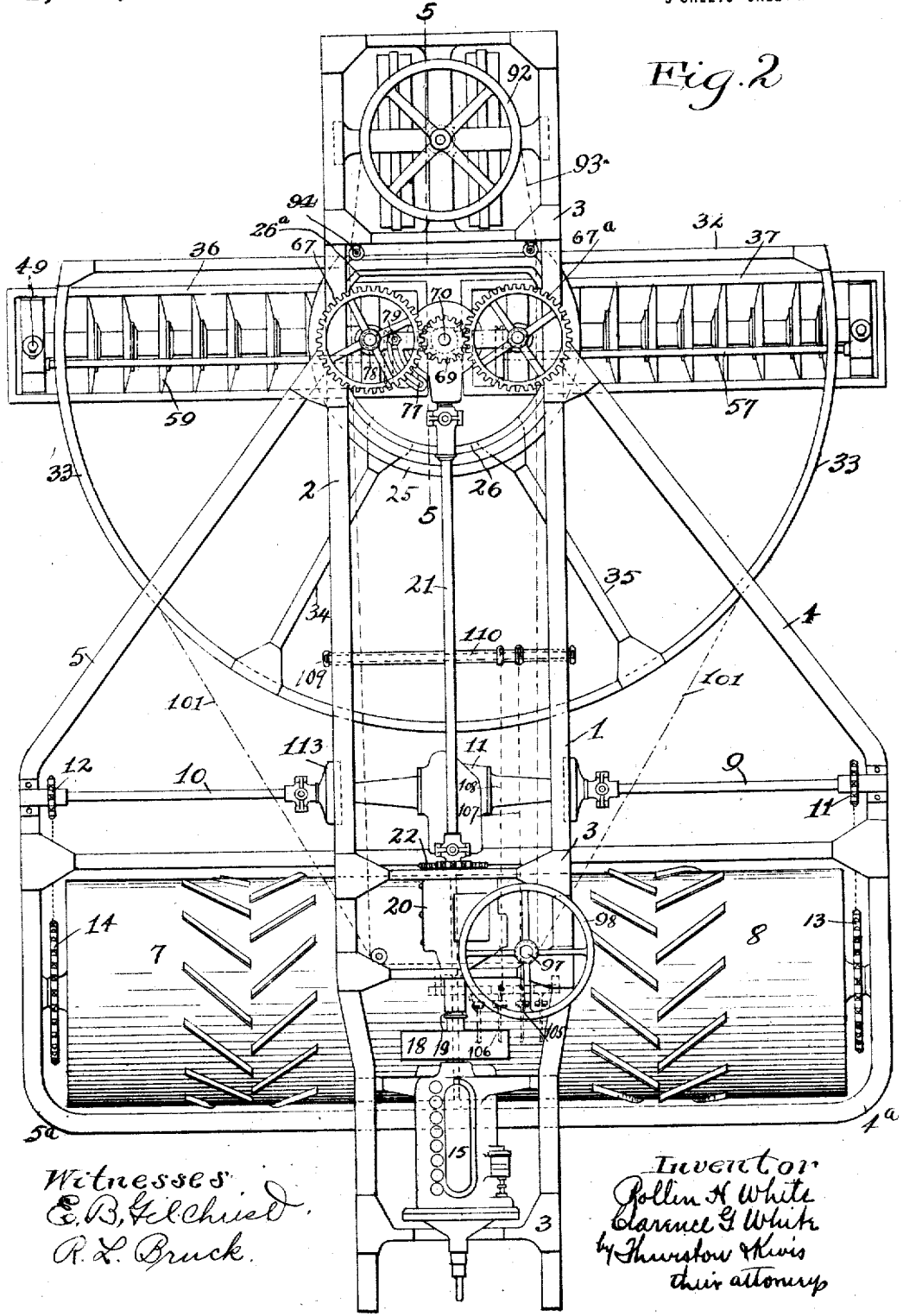

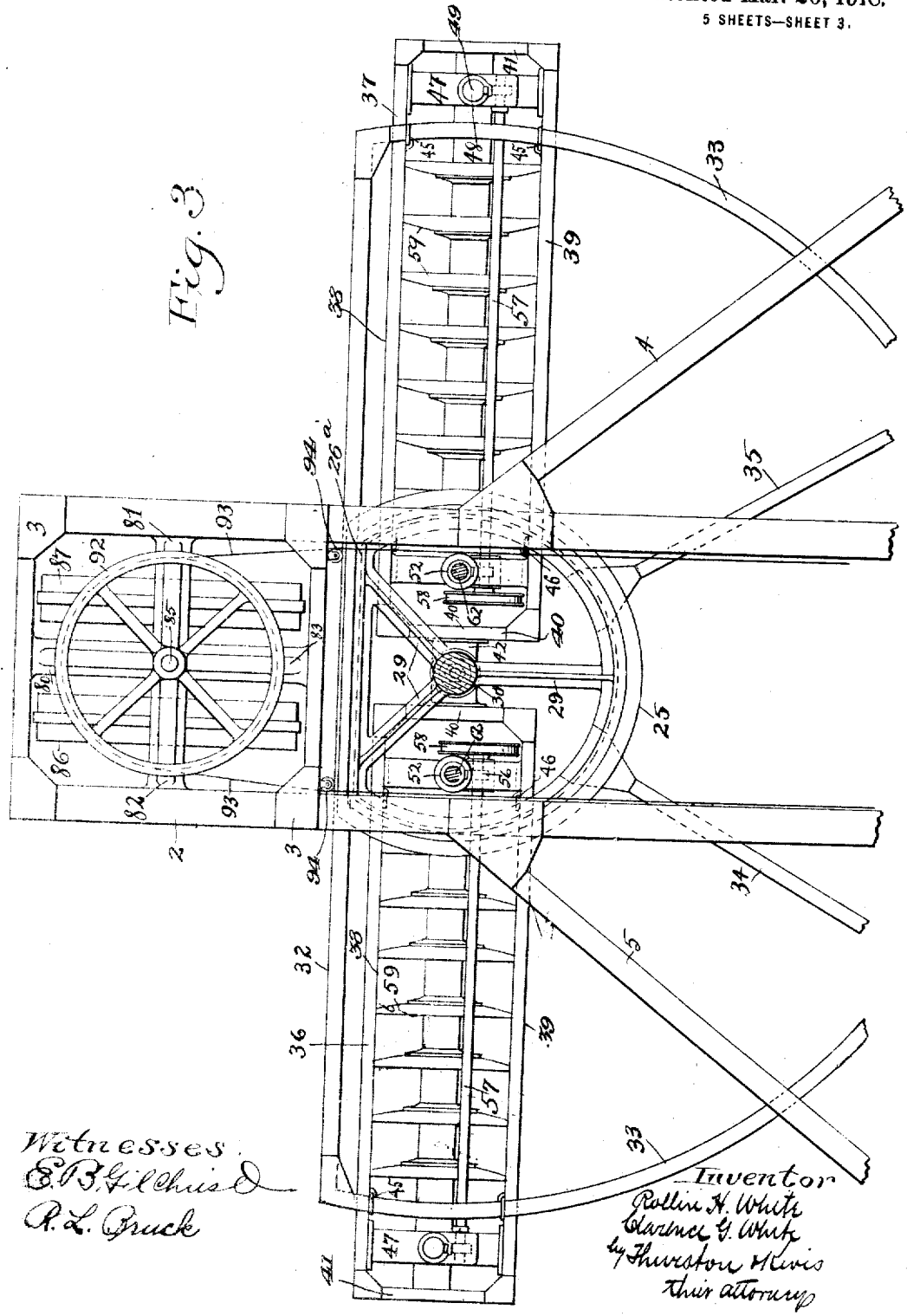

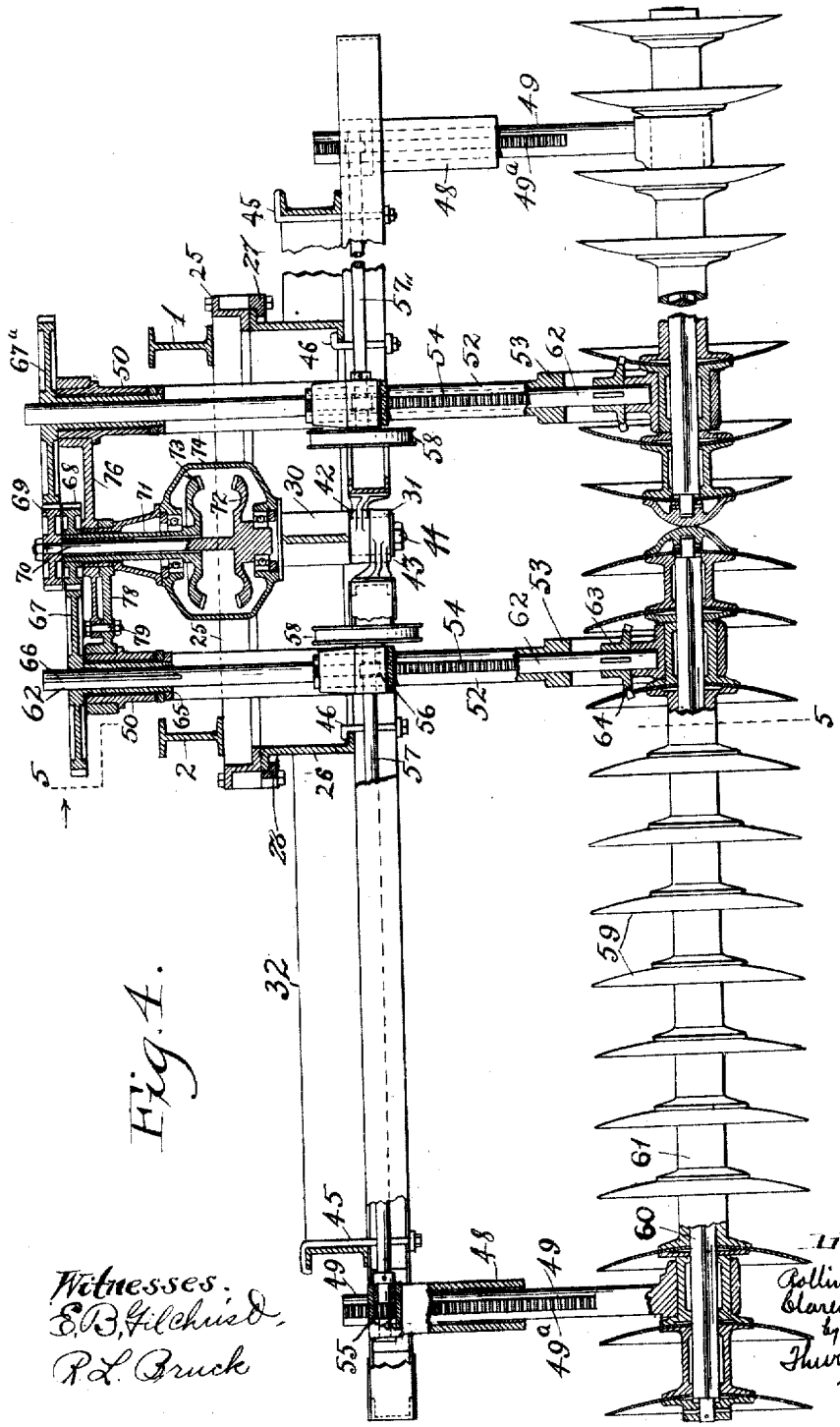

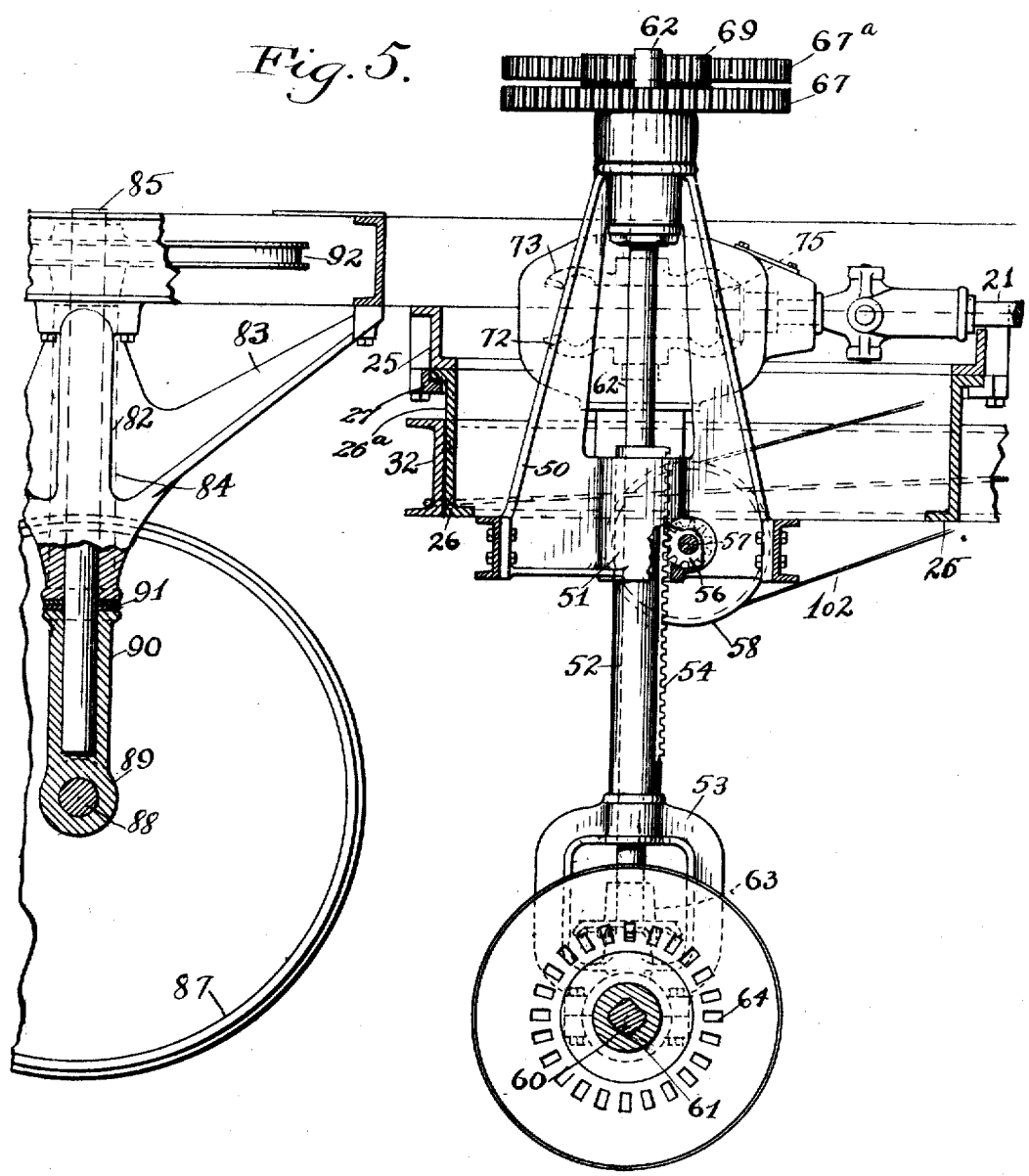

UNITED STATES PATENT OFFICE.

ROLLIN H. WHITE, OF CLEVELAND, OHIO, AND CLARENCE G. WHITE, OF HAIKU, TERRITORY OF HAWAII, ASSIGNORS TO THE CLEVELAND TRACTOR COMPANY, OF EUCLID, OHIO, A CORPORATION OF OHIO.

POWER-PROPELLED AGRICULTURAL MACHINERY.

1,260,738.   Specification of Letters Patent.   Patented Mar. 26, 1918.

Application filed June 8, 1912.   Serial No. 702,466.

*To all whom it may concern:*

Be it known that we, ROLLIN H. WHITE and CLARENCE G. WHITE, citizens of the United States, and residents, respectively, of Cleveland, in the county of Cuyahoga and State of Ohio, and Haiku, in the county of Maui and Territory of Hawaii, have invented a certain new and useful Improvement in Power-Propelled Agricultural Machinery, of which the following is a full, clear, and exact description.

This invention relates to power propelled agricultural machinery.

The object is to provide a self propelled traction machine and to equip this traction machine with devices which are designed to engage with the soil to plow or harrow the same.

The engine employed to furnish power is preferably of the motor vehicle type, and the machine is provided with devices to effect various speeds of the driven members.

With this object in mind, the invention may be said to comprise the elements and combinations thereof set forth in the accompanying claims.

Reference should be had to the accompanying drawings forming a part of this application in which Figure 1 is a side elevation of the machine; Fig. 2 is a top plan view of the machine; Fig. 3 is a top plan view of the rear portion of the machine, with portions of the apparatus removed; Fig. 4 is an end elevation with parts in section of that part of the machine carrying the disks and driving connections for the disks; Fig. 5 is a sectional elevation upon the line 5—5 of Fig. 2.

A machine constructed in accordance with this invention comprises a chassis having side pieces 1 and 2 which are suitably joined together at various points throughout their length by cross pieces 3.

There is also an auxiliary frame or chassis which comprises side pieces 4 and 5. These are bent in the manner represented in Fig. 1 and are so arranged that portions 4ª and 5ª extend below and are substantially parallel with the side pieces 1 and 2 of the main chassis. Upon the portions of the auxiliary frame 4ª and 5ª there is mounted a shaft 6 which is suitably journaled upon and extends between the same.

Upon this shaft is mounted a two-part traction roller, the parts of the roller being designated at 7 and 8 respectively. Behind the traction roller there is mounted upon the auxiliary frame a transverse shaft consisting of the parts 9 and 10 which are joined together by a differential mechanism contained within the casing 11. The shafts 9 and 10 carry at their outer portions gear wheels 12 and 12ª.

There are also gear wheels 13 and 14 carried by the portions 8 and 7 of the traction drum. The sprockets 12 and 13 and the sprockets 12ª and 14 are suitably connected by a chain so that motion may be transmitted from the shafts 9 and 10 to the portions 7 and 8 of the traction roller.

The differential mechanism connecting the shafts 9 and 10, may be of usual construction. Its function is the usual one, viz: to permit the shafts 9 and 10 to rotate at different speeds under certain conditions which, of course, permits the two parts 7 and 8 of the traction roller to do the same.

At the forward part of the chassis there is mounted an engine 15 which may be of any desired type and is designed to furnish power to drive the various instrumentalities which are associated with this machine. The engine is protected by a hood 16 of usual construction, which is provided with a radiator 17.

The crank shaft of the engine is as usual equipped with a fly wheel 18, which by suitable clutch mechanism is operatively connected with a shaft 19. This shaft extends into a transmission casing 20, which casing contains the usual mechanism for changing the speed and for reversing the direction of travel of the machine.

The driven shaft emerging from the casing 20 is indicated at 21 and this shaft is provided with a sprocket wheel 22 which is in alinement with a sprocket wheel 23. The sprocket wheel 23 is carried by the shaft 24 which extends within the housing 11 and is the driving shaft for the differential mechanism contained within the housing 11. The sprocket wheels 22 and 23 are connected by a sprocket chain which completes the necessary connections between the engine 15 and the portions 7 and 8 of the traction roller so that the same may be driven.

Upon the side pieces 1 and 2 of the chassis toward the rear portion thereof there is secured a member 25, which we may describe as the pivot for a turn-table. This member is arc shaped or circular throughout the greater portion of its peripheral extent. The member 25 is formed with oppositely projecting flanges at the top and bottom thereof.

Coöperating with the member 25 is a member 26 which is of substantially the same configuration as the member 25 and also is formed with oppositely projecting flanges at the top and bottom. The upper flanged portion of the member 26 is secured against the lower flanged portion of the member 25 by means of an L-shaped ring member 27 which engages beneath the upper flange or extension upon the member 26. This L-shaped ring 27 is held upon the member 25 by means of bolts, such as represented at 28, which bolts coöperate with the upper flange of the member 25. It will readily be seen from the construction described that the members 25 and 26 may move relatively to each other, sliding upon their contacting flanges.

The member 26 is provided with arms 29 which extend toward the center of the member and join in a central body or hub 30. This hub has a downwardly projecting stub axle 31.

As before mentioned, the member 26 is substantially circular throughout the greater portion of its length. However, a portion of this member represented at 26ª in Fig. 3 is substantially straight, and to this member 26 there is secured a cross member 32 which is substantially straight. To the opposite ends of the cross member 32 there is secured the opposite ends of a circular member 33. The member 33 is also joined to the circular portion of the member 26 by bracing pieces 34 and 35, as suggested in Fig. 3. It will thus be seen that the member 26, with the member 32 and 33 forms a rigid structure or turn table which may move upon the member 25, acting as a pivot.

Carried by the rigid structure or turn table just mentioned are frames generally represented at 36 and 37, which frames comprise side pieces 38 and 39, and end pieces 40 and 41. The end pieces 40 are provided with extensions 42 and 43 having openings therethrough which engage with the stub axle 31 before mentioned, and these extensions 42 and 43 are held in place by a nut 44. The frames 36 and 37 are secured to the members 26 and 33 respectively. Any desired form of connection may be used, but I have shown for the purpose L-shaped bolts represented at 45 and 46.

Toward the outer portion of each frame 36 and 37 there is a cross brace 47 having an opening through which extends a sleeve 48, the sleeve being secured in the opening. Through the sleeve there extends a shaft 49, the shaft at its lower end supporting a journal in which is mounted a hub or spool which spaces apart the disks, as will later be described.

Near their inner ends the side members of the frames are joined by standards 50, these standards being more completely shown in Fig. 5.

The standards are preferably formed as a unitary structure, the lower part or base of the structure being joined to the opposite sides of the frames 36 and 37. The sides of the standards are slanting and the central part is open. Each standard in the lower part or base thereof is formed with an enlarged hollow portion generally represented at 51, in which is journaled a sleeve 52.

At the lower portion of the sleeve there is a yoke 53 which supports a journal adapted to engage one of the hubs or spools which space apart the disks.

The sleeve 52 is formed with a rack 54, and the shaft 49 is formed with a rack 49ª. These racks 49ª and 54 engage with pinions 55 and 56, which pinions are both upon a shaft 57. The shaft is journaled in the cross member 47 and the base of the standard 50. The shaft extends slightly beyond the base of the standard 50 and on the extending portion of each shaft there is a wheel 58 which is operated in a manner later to be described, and by the turning of which, the pinions engaging with the racks 49ª and 54 may be operated so as to raise and lower the shaft 49 and the sleeve 52, thereby raising and lowering the disks.

The disks 59 are in the main of usual construction and are mounted upon a squared shaft 60. These disks are provided with square openings which fit upon the squared shafts 60 and are spaced apart by means of spools or hubs 61. As before stated, one of these spools is mounted in a journal carried by the lower part of the shaft 49, and another is mounted in a journal carried by the lower part of the sleeve 52. This permits of the rotation of the shaft, spools and disks.

Extending through each sleeve 52 is a shaft 62, which at its lower end is journaled in a portion of the yoke 53. Upon this shaft is a gear wheel 63, the same being provided with teeth. These teeth are adapted to extend into openings 64 formed in a disk 59, which is adjacent to the gear wheel 63. As shown in Fig. 5, the openings 64 extend in an annular series, and it will therefore be apparent that rotation of the gear 63 results in rotating the disk 59 in which the openings are formed, and inasmuch as the disks 59 are all rigidly secured to the shaft 60, the driving of the one disk results in driving all the disks or gang of disks, as they are called, associated with the shaft 60.

There are two such gangs of disks, which gangs are carried respectively from the frames 36 and 37. The mounting of each gang of disks upon its square shaft, as well as the mounting with respect to the frames 36 and 37 are the same. Also the manner in which the raising and lowering of each gang of disks is accomplished is the same in both instances.

It will be apparent that the frames 36 and 37 may be varied in their relationship with respect to the members 26 and 33 of the rigid structure or turn table upon which they are mounted.

With the members 26 and 33 remaining in the position which is shown in Fig. 3, these frames 36 and 37 may be moved as desired by loosening and slidably adjusting bolts 45, 46 on 33 and 36, so that they occupy any desired angular position with respect to themselves, and to the chassis of the machine. In this way, the angle at which the disks 59 engage the ground relative to the direction in which the vehicle as a whole is moving may readily be varied.

When the disks 59 engage the ground and cut the same at an angle with respect to the direction in which the vehicle is traveling, these disks then cause a cutting and turning of the soil, and thereby act as a plow of the disk type. As before stated, it is possible to vary the angular engagement and by so much the amount of turning over of the ground by the engagement of the disks with the ground.

In the particular position shown in Fig. 3, the disks may be used as a harrow.

The driving of the disks carried by frame 36 is accomplished through the shaft 62, and this shaft as before stated is journaled through the sleeve 54 and is also journaled at its upper end, in a sleeve 65. The shaft 62 has a driving relation with the sleeve 65 through a key or feather 66. This permits the shaft 62 to move through the sleeve 65 without destroying the driving relationship.

The sleeve 65 is journaled in the upper portion of the standard 50 and is rigidly joined with or integral with the gear 67.

The shaft which is companion to the shaft 62 and drives the gang of disks carried by the frame 37 is mounted in a manner to have a sliding and driving connection with a gear 67ª in the same manner as the shaft 62 with the gear 67. The gear 67 meshes with a gear 68 and the gear 67ª meshes with a gear 69. The gear 69 is mounted upon a shaft 70, while the gear 68 is mounted upon a sleeve 71. To the shaft 70 there is secured a gear 72, while to the sleeve 71 there is secured a gear 73. These gears are mounted within a housing 74, and this housing at its lower end is secured upon the body or hub 30.

The driven shaft 21 extends within and is journaled in a portion of the casing 74. This shaft has a gear 75 mounted thereon, as shown in Fig. 5, which gear meshes with the gears 72 and 73. The purpose of the construction just explained is to form a driving connection with shaft 21, such that the disks in each gang may move with the same speed and in the same direction.

It is our opinion that the disks operate more efficiently in working upon the soil, if they are rotatively driven so as to have a peripheral speed greater than would be the lineal speed of a point on the periphery of a disk. It would be difficult to state just what ratio between the lineal speed of the machine and the speed of the rotation of the disks should be, for it depends in a measure upon the character of the soil in which the disks are operating.

Upon the upper part of that standard 50 carrying gears 67ª, there is pivoted an arm 76. The arm is provided with a central opening which engages with the neck or upper portion of the casing 74. At the free end, this arm 76 is provided with a curved slotted portion indicated at 77, in Fig. 2.

Upon the upper portion of the other standard 50 there is likewise pivoted an arm 78, and this arm is also provided with a portion which encircles and engages the neck and upper portion of the casing 74. The arm 78 has a bolt or stud 79 mounted thereon, which extends through the slotted portion 77 of the arm 76. The bolt permits the arms 76 and 78 to be secured together so as to form a rigid support between the standards 50 and also a support for the upper portion of the casing 74.

When the frames 36 and 37 are adjusted with respect to the members 26 and 33, the bolt 79 is loosened to permit the arms 76 and 78 to adjust themselves in accordance with the change in angular relation effected between the frames 36 and 37. When these frames are secured in their adjusted position, the bolt 79 is again tightened which holds the arms 76 and 78 rigidly secured to each other.

At the rear portion of the chassis and beneath the same there is mounted a guiding wheel or wheels, this being more particularly for the purpose of steering the machine when the same is running over the ground as a traction device.

A frame comprising four slanting arms 80, 81, 82 and 83 are joined to the side members 1 and 2 of the chassis and to adjacent cross members 3. These arms meet in the center in a common hub 84, which is somewhat elongated to form an extended bearing for a shaft 85 which is journaled in the same.

There are two wheels 86 and 87 which may be of any desired construction. As shown, they are formed with a rather broad periphery, or rim and provided with an annular rib in substantially the central portion of the rim. These wheels are mounted upon a common axle 88 and the wheels are spaced apart by means of a member having a sleeve portion 89, through which the axle 88 extends, and an upright portion 90, into which the shaft 85 extends and to which the said shaft is secured. Between the hub 84 and the member 90 there are bearing plates 91, which readily permit a relative turning of the member 90 with respect to the member 84.

At the upper part of the shaft 85 there is a wheel 92. Around this wheel there is a cable 93 which upon passing from the wheel engages with guide rollers 94 and extends parallel with the chassis of the machine toward the front portion thereof.

At the forward portion of the chassis there is mounted a tubular element 95 as shown in Fig. 1, the same being journaled in a suitable manner upon the chassis frame. This tubular member at its upper portion is provided with a hand wheel 96.

Within the tubular element 95 there is a shaft 97 which is provided with a hand wheel 98 above the hand wheel 96.

The lower portion of the tubular element 95 is provided with a small drum 99 and upon the lower end of the shaft 97 there is a drum 100. The cable 93 which coöperates with the wheel 92 is suitably secured upon the drum 100 so that the turning of the wheel 98 causes the cable to be appropriately moved so as to effect a turning of the wheels 86 and 87 in a direction to accomplish the steering of the machine.

The circular member 33 which forms a part of the turning table upon which the gangs of disks are carried is preferably formed with an external channel in which is laid a cable 101, which cable is suitably secured to the member 33 and also coöperates with the drum 99 upon the tubular element 95. Therefore a turning of the hand wheel 96 in a proper direction will effect a corresponding turning of the turn table and the gangs of disks carried thereby.

The machine when in use as a harrow or plow may be guided very effectively by manipulation of the hand wheel which controls the turn table by which the gangs of disks are carried and this control is much quicker and more effective than would be the control effected by the manipulation of the wheels 86 and 87, that is to say, when the disks are in use as a plow or harrow.

However, when the machine is merely acting as a traction device, or being propelled from place to place, the disks not being in service, it is then necessary to provide a means for steering the rear wheels 86 and 87 which is accomplished in the manner heretofore set forth.

Each of the wheels 58, which are upon the shafts that govern the lifting and lowering of the gangs of disks, coöperates with a cable 102, which cable extends to a forward portion of the chassis where it engages with a drum carried by a hand wheel 103, the hand wheel being preferably mounted upon the portion of the chassis which is adjacent to the various devices for operating the various instrumentalities associated with the machine. It will be apparent that the operation of the wheel 103 results in the raising and lowering of each gang of disks as a unit.

Mounted upon the chassis adjacent to the various operating devices for the different instrumentalities of the machine is a seat 104, which is to be occupied by the operator of the machine, and as will be apparent from the description of the machine and the illustration of the drawings, it is the intention to locate the various operating devices in such manner that they may be conveniently operated by the driver of the machine.

It will be perfectly apparent that the machine may be provided with appropriate brake mechanism, and while various forms of brake mechanism may be used, it may be pointed out in a general way that suitable foot levers coöperate with rods, which rods coöperate with levers such as shown at 109 carried upon a shaft 110 journaled upon the side portions 1 and 2 of the chassis. The shaft 110 is provided with a suitable rod connection 111 which operates the brake mechanism represented at 112 in Fig. 1, upon a drum 113 which is associated with the shaft 10.

It will be understood that there is a similar drum and brake mechanism associated with the shaft 9. Therefore, it will be apparent that it is possible to apply braking force to either the shaft 9 or shaft 10, singly or both together.

It will be noticed that the traction device assumes the form of a roller extending across the width of the machine. This roller is made in two parts, as heretofore explained, but the parts are so related to each other as to give in effect a substantially continuous roller.

When the machine is in use, the broad roller accomplishes a rolling of the plowed or harrowed soil, which tends to pulverize or work up the soil into a desirable condition for planting.

In fact, the machine may be used for the purpose of rolling alone, by merely elevating the disks to such a position that they will not contact with the ground, or they may be omitted or removed from the machine. Under such conditions, the machine is guided or steered by the rear wheel, while the traction roller performs its function of breaking up and pulverizing the previously plowed or harrowed soil.

The auxiliary frame upon which the traction roller is mounted forms a very suitable and efficient means for mounting the roller, but obviously other means of mounting the roller with respect to the chassis may be used, and still be within the scope of this invention.

Having thus described our invention, what we claim is:

1. In a machine of the character described, the combination with a chassis of a power producing device carried thereby, an annular traction roller extending transversely beneath the chassis and supporting the chassis, driving connections between the power producing device and said roller, one or more disks, a mounting for said disks, said mounting being pivotally supported from and beneath the chassis.

2. In a machine of the character described, the combination with a chassis of a power producing device carried thereby, an annular traction roller extending beneath and transversely of the chassis and supporting the chassis, driving connections between the power producing device and said roller, a steering roller adjacent one end of the machine, means for steering the said roller, one or more disks and a mounting for said disks, said mounting being pivotally supported from and beneath the chassis.

3. In a machine of the character described, the combination with a chassis, a power producing device carried thereby, an annular traction roller extending transversely beneath the chassis and supporting the chassis, operative connections between the traction roller and the power device, a frame pivotally supported from the chassis, one or more disks supported by said frame, means for raising and lowering the said disks with respect to the frame, and means for driving the disks from the said power producing device.

4. In a machine of the character described, the combination with a chassis of a power producing device carried thereby, an annular traction member supporting the chassis, operative connection between the traction member and the power device, a frame pivotally supported from the chassis, a disk frame carried by the first mentioned frame, supporting and moving devices engaging each frame at two points, means for operating said devices for raising and lowering the disk frame, and disks carried by the disk frame.

5. In a machine of the character described, the combination with a chassis of a power producing device carried thereby, an annular traction member supporting the chassis, operative connections between the traction member and the power device, a frame pivotally supported from the chassis, a disk frame carried by said first mentioned frame, telescoping supporting members supporting said disk frame, driving connections extending through said telescoping members, disks carried by the disk frame, said driving connections operating with the disks to drive the same.

6. In a machine of the character described, the combination with a chassis of a power producing device carried thereby, an annular traction member supporting the chassis, operative connections between the traction member and the power device, a pair of frames pivotally supported by the chassis, disks supported from the said frames, a drive shaft extending from the power producing device, geared connections permitting angular movement between the pair of frames, and a raising and lowering movement of the frames with respect to the chassis.

7. In a machine of the character described, the combination with a chassis, of a power producing device carried thereby, an annular traction member supporting the chassis, operative connections between the traction member and the power device, a plurality of gangs of disks, a mounting for each gang, said mountings being pivotally connected with the chassis, means for adjusting each mounting with respect to the other mountings, and with respect to the chassis, and means for moving the said mountings as a unit with respect to the chassis.

8. In a machine of the character described, the combination with a chassis of a power producing device carried thereby, an annular traction member supporting the chassis, operative connections between the traction member and the power device, a plurality of gangs of disks, a mounting for each gang, said mountings being pivotally connected with the chassis, means for adjusting each mounting with respect to the other mountings and with respect to the chassis, means for moving the said mountings as a unit with respect to the chassis, and means for driving the said disks.

9. In a machine of the character described, the combination with a chassis, of a power producing device carried thereby, an annular traction member supporting the chassis, operative connections between the traction member and power device, a member having an arc-shaped periphery secured to the chassis, a turn table provided with an arc-shaped portion engaging with the periphery of the member carried by the chassis, a plurality of frames adjustably secured upon said turn table, one or more disks carried by the said frames, and means mounted upon the chassis operatively connected to the turn table, whereby the same may be turned.

10. In a machine of the character described, the combination with a chassis, of a power producing device mounted upon said chassis, a traction device upon which the chassis is mounted, operative connections between the power device and the traction device, whereby the machine is driven, a shaft supported from the said chassis, one or more disks fixedly mounted upon said shaft, and operative connections from the power device and directly to one of the said disks, whereby all the said disks may be driven.

11. In a machine of the character described, the combination with a chassis, of a power driven device carried thereby, an annular traction member supporting the chassis, a frame pivotally mounted upon said chassis, a shaft, one or more disks upon said shaft, means for supporting the said shaft from the frame, a driving shaft carried by the means for supporting the disk shaft, a gear carried by said shaft, said gear having operative engagement with a disk adjacent thereto, whereby the disk and shaft are driven as the gear is rotated, and operative connections between the driving shaft and the power device.

12. In a machine of the character described, the combination with a chassis, of a power producing device carried thereby, an annular traction member supporting the chassis, operative connections between the power device and the traction member, a frame pivotally supported upon said chassis, sleeve members supported by the frame, a shaft journaled in the sleeve members below the frame, one or more disks carried by the said shaft, means for raising and lowering the sleeves with respect to the frame, a shaft extending through one of said sleeves, a gear carried upon said shaft, operative connections between said gear and one of the disks upon the shaft, whereby when the gear is rotated, the disks are rotated, and operative connections between the said shaft and the said power device.

13. In a machine of the character described, the combination with a chassis, of a power producing device carried thereby, an annular traction member supporting the chassis, operative connections between the power device and the traction member, an annular member adapted to engage the same surface as the traction member, said annular member being pivotally mounted with respect to the chassis, a gang of disks pivotally mounted upon said chassis, a steering device mounted upon said chassis, operative connections between said steering device and the disks, and operative connections between the steering device and the before mentioned annular member, whereby either the disks or the annular member, or both, may be turned.

In testimony whereof, we hereunto affix our signatures in the presence of two witnesses.

ROLLIN H. WHITE.
CLARENCE G. WHITE.

Witnesses:
 E. L. THURSTON,
 A. J. HUDSON.